Feb. 21, 1961     R. ABRAMS     2,972,730
PRESSURE MOUNTED LUG
Filed May 16, 1955
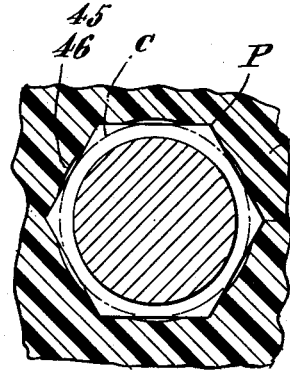
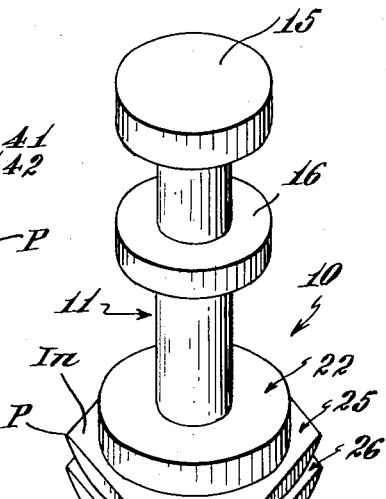
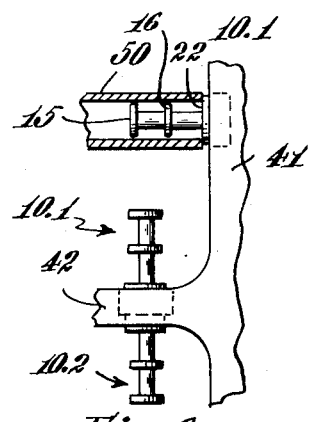
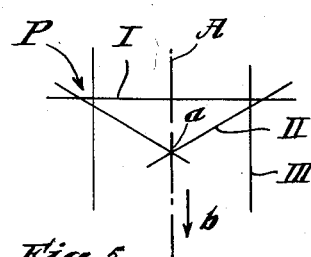
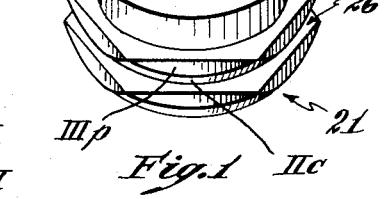
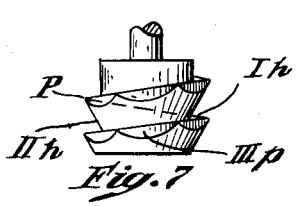
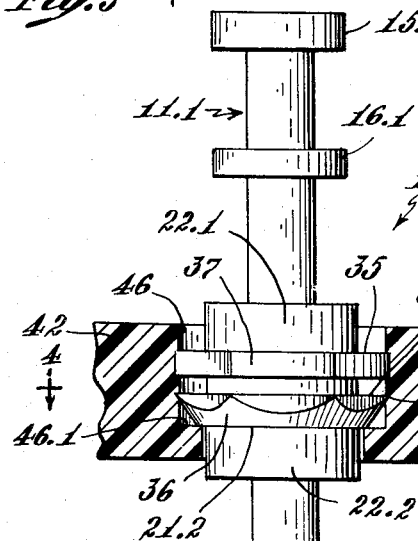
Inventor
Ralph Abrams
by Roberts, Cushman & Grover
Attys United States Patent Office 2,972,730
Patented Feb. 21, 1961

2,972,730
PRESSURE MOUNTED LUG

Ralph Abrams, Sharon, Mass., assignor to Cambridge Thermionic Corporation, Cambridge, Mass., a corporation of Massachusetts Filed May 16, 1955, Ser. No. 508,513

8 Claims. (Cl. 339—221)

It is often desirable to attach to supporting structures or mounts firmly, but with a minimum of effort and skill, fixtures protruding therefrom. Various devices of that type have been proposed, but they are either not sufficiently simple and yet accurate in assembly, or require either special structures that have to be attached to the mount, or comparatively complicated machining thereof, or require special tools for assembly, or cannot be easily separated and are unsuited for reuse, or are insecurely attached.

Some of the objects of the present invention are to provide a fixture for assembly with a mount which can be very easily joined requiring merely a simple pushing movement, to provide such an assembly the mount or supporting structure of which (such as a terminal board for mounting solder lugs) can be made with a blind hole in order to provide an insulated closed back, to provide such a device which can be assembled as well as dismantled without disconnecting or removing an existing supporting structure, and to provide such an assembly which requires only the most simple type of tool or no tool at all for joining its components, which facilitates extension, repair and dismantling in service. Other objects are to provide a pressure mounted terminal lug of the above type which is especially inexpensive and easy to apply while reliable and accurate in every respect, and the basic construction of which lends itself for adaptation to various uses, depending on requirements at hand.

A brief summary of the invention indicating its nature and substance, for attaining the above objects, is as follows.

A lug or similar fixture member, constructed according to the invention for attaching it to a mount or receptacle having an opening such as a cavity or aperture, comprises a head with one or more anchor bodies each bounded by two surfaces which are generated by lines inclined to an axis of the head and by a third surface having faces pairs of which intersect to form edges which are essentially parallel to this axis; the first two surfaces intersect at a line which is at least partly outside of the third surface but approaches the edges to form barb shaped corners. The distance between opposite corners is greater than a corresponding diameter of an opening of the mount or receptacle. In a preferred embodiment, the first surface is a plane normal to the axis of the body, the second surface is a cone, and the third surface is a hexagonal prism, coaxial with the second surface. The edges of the prism are near to, but need not necessarily intersect at, the line of intersection of the first two surfaces, provided that a barbed structure results, such that upon pressing the head of the lug into the slightly smaller opening of the supporting receptacle structure, the barbs attach the body firmly to the wall portions of the opening.

In a preferred and especially practical aspect of the invention, a device for fastening a fixture to a receptacle or socket mount member (such as a panel) having a circular opening (either in the form of a rearwardly closed recess or of an aperture having a shoulder) comprises a fixture member (such as a lug) having a head made from a polygonal prism having cut thereinto (to form an anchor body) transverse shoulders and, opposite to the shoulders, conical necks which intersect the shoulders approximately at the longest diameter of the polygonal cross-section of the prism, such that edge portions of the prism are essentially preserved to form barb or prong portions protruding beyond the conical neck. The diameter of the cavity or aperture of the receptacle is shorter than the said longest diameter of the head, so that the barbs firmly engage the inside of the opening when the head is pressed thereinto. For certain purposes, several anchor bodies are combined, such as by providing the head with several transverse shoulders (or with a continuously helical shoulder) and with a corresponding number of conical necks (or a continuously helical cone); some of these anchor bodies can have transverse, opposite shoulders on either side to preserve the prism edges instead of forming barbs. The head carries a utility fixture (such as a solder lug) on one side if it is mounted in a rearwardly closed opening, but it can carry a utility component on each side if it is to be mounted in an aperture of the supporting structure.

The assembly according to the invention is in every instance characterized by a head, part of a utility fixture, which head has anchor bodies that can be formed by conically turning down prismatic stock to obtain barbs at the edges of such stock, and by a mount made of material that is softer than that of the head, and has an opening for the head which is slightly smaller than the barb diameter so that the barbs, if inserted with the conical surface in front, will resist pulling out and secure the fixture.

The following description of several typical embodiments illustrates these and other objects and aspects of novelty of the invention. This description refers to a drawing in which Fig. 1 is an axonometric view of a terminal device incorporating the invention;

Fig. 2 is a side elevation of a device according to Fig. 1, upon insertion into a recess of a mounting panel shown in section;

Fig. 3 is a side elevation, similar to Fig. 2, of a second embodiment of the invention, having a terminal lug on each side and a prismatic as well as a barbed anchor body pressed into a counter bored perforation of a mounting panel shown in section similar as in Fig. 2;

Fig. 4 is a cross-section on lines 4—4 of Figs. 2 and 3;

Fig. 5 is a diagram illustrating the construction of an anchor body according to the invention;

Fig. 6 is a side elevation indicating the manner in which terminal lug fixtures and mounts according to Figs. 1 to 4 can be assembled, and indicating the assembly with the aid of a tool; and Fig. 7 is a side elevation, similar to Fig. 2, of an anchor body according to the invention, defined by helical surfaces instead of the circular surfaces shown in the preceding figures.

Figs. 1 to 3 show a lug 10 with a stud 11 having two flanges 15 and 16 making it especially suitable for attaching thereto an electric conductor by means of soldering it to the stud portion between the two flanges. At the other end, the lug 10 has a mounting head or insert 21. Between the stud 11 and the head 21 is a shoulder portion 22. The head 21 consists in the present embodiment of two anchor bodies 25 and 26 each of which is constituted as follows.

An anchor body according to an especially practical embodiment of the invention is formed by three surfaces whose position relatively to the lug as a whole and relatively to each other is indicated in Fig. 5 by their lines of intersection with a plane through the lug axis A. One surface, indicated by the trace I, intersects the axis A at a steep angle; it can be a flat face at right angles to the axis A as shown at I$n$ of Fig. 1, or it can be a helical surface as indicated at I$h$ of Fig. 7. The second surface, indicated by the trace II of Fig. 5, is conically generated by the rotation of a line that obliquely intersects the axis A at a point $a$ as shown at II$c$ of Fig. 1, or that moves in the direction of arrow $b$ to form an obliquely helical surface as shown at II$h$ of Fig. 7. The third surface is that of a prism, indicated in Fig. 5 with one of its edges III and at III$p$ of Figs. 1 and 7.

It will be noted that this peculiar anchor body, defined by the above described intersecting surfaces, defines prongs or barbs which protrude beyond the inscribed circle of the polygonal cross-section of the prismatic surface III. Fig. 4 indicates this circle at $c$ and it also indicates the barbs or prong points P. As clearly indicated in Fig. 5, the three surfaces do not have to intersect precisely at the point P, but some deviation will still provide a barb that is sufficiently sharp for purposes of the invention.

The mount, or supporting structure for receiving the anchor body, for example a panel to which a terminal lug is to be attached, is preferably, but not necessarily, made of somewhat yielding plastic material. Many materials of diverse composition are suitable for this purpose. Panels made from the plastic materials that are commercially available under the trade designations "Glass Silicon Terminal Board," "Linen Base Phenolic Resin" and "XXX Phenolic Terminal Board" were found to be fully satisfactory. Such panels are indicated at 41 of Figs. 2 and 4, and at 42 of Figs. 3 and 4. This mount or receptacle has a hole, such as the cavity 45 indicated in Fig. 2, or the aperture 46 indicated in Fig. 3.

The anchor body according to the invention, such as exemplified by the head 21 of Fig. 1, is on each side associated with a utility element such as a soldering lug, if a receptacle construction such as shown in Fig. 3 is employed, whereas a cavity receptacle can be used for lugs with one stud, according to Fig. 2.

In the case of an apertured receptacle, the hole is advantageously counterbored to provide it with a shoulder 46.1 (Fig. 3), whereas the bottom 45.1 (Fig. 2) of a cavity receptacle serves the same purpose.

In the especially simple and generally useful embodiment according to Figs. 1, 2 and 4, the head 21 has two anchor bodies 25, 26 of similar shape, and is made from hexagonal stock, for example of brass, turned on a screw machine into the shapes herein described, in conventional manner which does not need detailed explanation.

It will be evident that the lug according to Figs. 1 and 2, with two similar anchor bodies 25 and 26, can be provided, according to Fig. 3, with two studs 11.1 and 11.2, carrying flanges 15.1, 16.1 and 15.2, 16.2, respectively. The head according to Fig. 3 has one barbed anchor body and one flat anchor body, in the manner to be described hereinbelow. In most instances the head will be similar to that shown in Figs. 1 and 2, and if especially secure anchorage is required, more than two anchor bodies can be provided.

It will be further evident that the sides of the prism, indicated at III of Fig. 4, do not necessarily have to be flat, but could for example be slightly concave, similar to a fluted prism.

The anchor wall of the receptacle, indicated at 45 (Figs. 2 and 4) and 46 (Figs. 3 and 4) has a diameter that is somewhat smaller than the diameter at opposite barbs P, as indicated in Fig. 4. Generally speaking, the diameter of the receptacle hole should be approximately equal to that of the above mentioned inscribed circle of the prism, indicated at $c$ in Fig. 4.

For assembling the fixture and the mount, the anchor body 21 is pressed into the opening 45 (Fig. 2) or 46 (Fig. 3), preferably by means of the simple tool indicated at 50 of Fig. 6. This tool is a tube that fits slidingly over flanges 15 and 16, but is narrow enough to rest on shoulder 22 (Fig. 2) or 22.1 (Fig. 3) without touching the rim of the mount 41 or 42 if the opening 45 or 46 should be deep enough to receive the shoulder.

The barbs P thereupon displace and sometimes slightly cut into the walls of the recess, depending on the material of the receptacle, until the anchor body 21 rests with its bottom face 21.1 against the bottom 45.1 of the recess of panel 41 (Fig. 2), or until the shoulder 21.2 of the anchor body according to Fig. 3 rests against the internal shoulder 46.1 of the counterbored perforation 46 of panel 42 (Fig. 3). As indicated in Figs. 2, 3 and 4, the points P penetrate into the inner walls of the opening of the receptacle component 41 or 42, anchoring the body 21 barb fashion, with the faces 25.1, 26.1, or 36.1 preventing the return movement, and with the face 21.1 or the shoulder 21.2 preventing movement in the other direction. It will be evident that the last mentioned provision is not absolutely necessary, since the points themselves, evenly distributed throughout the periphery of the body 21 provide anchorage that is sufficient for many purposes, although it is much easier to move the device in the direction $b$ as indicated in Fig. 5 than to move it in the opposite direction, which is quite difficult and often involves marring of the receptacle material.

Although the use of a simple tool such as indicated in Fig. 6 is preferred, it is often possible to insert a lug according to the invention merely by pressure on the end of the stud, especially if the stud is made of a material that resists bending of the stud and the mount is not unusually hard.

Fig. 6 indicates how the embodiments according to Figs. 2 and 3 respectively can be applied to single face or double face supporting elements, indicated at 41 and 42 in correspondence with Figs. 2 and 3 respectively. As mentioned above, the use of a tool 50 is likewise indicated in Fig. 6.

Fig. 3 indicates how in some instances one or more of the anchoring bodies can be made with two parallel shoulder faces, providing steadying edges rather than anchoring points. Surface II of Fig. 5 is in this instance flat and parallel to surface I, defining a body 35 having a polygonal flange 37 instead of the barbed conical shape that is shown for body 36 of Fig. 3 and for both anchor bodies of the embodiment according to Figs. 1 and 2. The construction according to Fig. 3 provides considerable resistance against wiggling, and the edge or double point of the polygonal flange 37, although offering more resistance against pushing into the recess, provides the same resistance against removal from the receptacle opening. For similar purposes, heads 21 with pairs of anchor bodies 25, 26 of reversed construction can be used, such that the flat surfaces I$n$ or the conical surfaces II$c$ of respective anchor bodies face each other. Such a head can be inserted from either side of an aperture, especially if the conical shapes are on the outside with the flat surfaces facing each other. Such a head will secure the device from moving in either direction.

Instead of making the anchor bodies with annular, concentric necks, they can be shaped helically, as indicated in Fig. 7. The general cross-section of this embodiment is quite similar to that of Fig. 2, with the difference that two or more windings of screw shaped faces, I$h$ and II$h$ corresponding to surfaces I and II of Fig. 5, respectively, are applied on the screw machine instead of a corresponding number of the annular faces I$n$ and II$c$ of Fig. 1. The polygonal prism faces III$p$ of Fig. 7 correspond to those indicated at III$p$ of Fig. 1.

As mentioned above, devices of this type are especially suitable for purposes of the soldering lugs widely used for attaching electrical wires or other terminals between the flanges 15.1 and 16.1, and 15.2 and 16.2.

It will however be evident that the lug can be made with other suitable appliances instead of the soldering studs, and fastened to a mount or receptacle by means of the anchoring head.

It should be understood that the present disclosure is for the purpose of illustration only and that this invention includes all modifications and equivalents which fall within the scope of the appended claims.

I claim:

1. A fastening device composed of a mount plate having a circular opening with a transverse surface therein; and a lug comprising a head with at least one prismatic portion having cut thereinto a transverse shoulder and a conical neck, with the prismatic portion being located between the shoulder and the neck, and with the neck diametrically increasing towards the shoulder and intersecting the shoulder approximately at the greatest diameter of the intersection of shoulder and prismatic portion where the edges of the prismatic portion are essentially preserved to form protruding barbs, the diameter of said opening of said mount plate being slightly smaller than the diameter of said barbs, whereby the bars upon assembly easily enter said opening but firmly engage the inside of the opening when the head is pressed thereinto against said transverse surface and resist removal in opposite direction.

2. A terminal lug comprising a stud having flange portions for attaching conductor means thereto; on said stud a head including a plurality of substantially axially displaced anchor bodies each formed by the intersection of a prism with a transverse face steeply intersecting the sides of the prism, and with a conical face coaxial with said prism, such that edge portions of said prism are at the intersections of said transverse faces and said conical faces, respectively, of each anchor body, kept intact sufficiently to constitute barb-shaped projections; and between said stud and said head a shoulder having a diameter of a dimension intermediate the diametric dimensions of said flange portions and said projections respectively; whereby said head can be pressed into a slightly smaller opening of a mount by means of a tubular tool fitting over said flange portions to sit on said shoulder.

3. A terminal device comprising a lug having a stud portion with flange means for attaching conductor means thereto; on said stud portion a head portion including a plurality of substantially axially displaced anchor bodies each of said anchor bodies being formed by the intersection of a prism with a transverse face steeply intersecting the sides of the prism, and with a conical face coaxial with said prism, such that edge portions of said prism are at the intersections of said transverse faces and said conical faces, respectively, of each anchor body, kept intact sufficiently to constitute barb-shaped projections; between said stud portion and said head portion a shoulder having a diameter of a dimension intermediate the diametric dimensions of said flange means and said projections respectively; and a mount having a circular opening with a transverse surface therein, the diameter of said opening being slightly smaller than the diameter of said prism at said projections; whereby said head portion can be pressed into said opening by means of a tubular tool fitting over said flange means to sit on said shoulder.

4. A device according to claim 3 wherein said circular opening is constituted by a cavity having a closed bottom, whereby said head portion rests against said bottom and said mount is uninterrupted on the side opposite said cavity and said lug.

5. A device according to claim 3 wherein said lug has a second stud portion, the two stud portions having said head portion therebetween, wherein said circular opening penetrates said mount to accommodate said second stud portion, and wherein said transverse surface of the mount is an annular shoulder against which said head portion comes to rest.

6. A device for attaching a fixture member to a mount member having an opening, which device comprises as part of said fixture member an anchor body bounded by two surfaces generated by rotation about the axis of the body of two lines which are inclined at different angles to said axis, respectively, such as to intersect at a circle centered on said axis, and by surface portions which are by said two surfaces cut from the longitudinal sides of an essentially prismatic surface having edges parallel to and equidistant from said axis, and which surface portions intersect said first two surfaces near said circle; whereby the anchor body can be shaped by cutting the first two surfaces into stock bounded by said prismatic surface, such as to form near the circle of intersection of the two first surfaces corners whose extreme extension is defined by the dimensions of the stock.

7. Device according to claim 6 wherein said lines which generate said first two surfaces move during such generation relatively to said axis, to define a helical anchor body.

8. Device according to claim 6 wherein one of said first lines is perpendicular to said axis and said longitudinal sides are flat.

References Cited in the file of this patent

UNITED STATES PATENTS

| | | |
|---|---|---|
| 821,029 | Dow | May 22, 1906 |
| 1,978,329 | Rosenberg | Oct. 23, 1934 |
| 2,256,401 | Maze | Sept. 16, 1941 |
| 2,393,923 | Miller | Jan. 29, 1946 |
| 2,400,647 | Kohring | May 21, 1946 |
| 2,523,001 | De Lamater | Sept. 19, 1950 |

FOREIGN PATENTS

| | | |
|---|---|---|
| 335,508 | Great Britain | of 1930 |